United States Patent [19]

Otonari et al.

[11] Patent Number: 4,857,396

[45] Date of Patent: Aug. 15, 1989

[54] MINUTE-CELLULAR POLYESTER FILM PROVIDED WITH COATING

[75] Inventors: Satoshi Otonari; Yoshinori Sato, both of Machida; Narihiro Masuda; Tomoyuki Kotani, both of Yokohama, all of Japan

[73] Assignee: Daifoil Company, Ltd., Tokyo, Japan

[21] Appl. No.: 219,049

[22] Filed: Jul. 14, 1988

Related U.S. Application Data

[63] Continuation-in-part at PCT JP88/00110 published as WO88/05797 on Aug. 11, 1988.

[30] Foreign Application Priority Data

Feb. 5, 1987 [JP] Japan .................................. 62-25245
Jul. 15, 1987 [JP] Japan .................................. 62-176237

[51] Int. Cl.$^4$ ................................................. B32B 3/26
[52] U.S. Cl. .............................. 428/315.5; 428/315.9; 428/480; 428/483; 428/910
[58] Field of Search ............... 428/315.5, 315.7, 315.9, 428/480, 482, 483, 910

[56] References Cited

U.S. PATENT DOCUMENTS 3,755,499 8/1973 Heijo et al. .......................... 525/174

FOREIGN PATENT DOCUMENTS 50-28459 9/1975 Japan .

*Primary Examiner*—William J. Van Balen
*Attorney, Agent, or Firm*—David G. Conlin; Ronald I. Eisenstein; Linda M. Buckley

[57] ABSTRACT

A film is disclosed, which comprises an at least uniaxially stretched finely cellulated polyester film of a high surface roughness having an apparent specific gravity in the range of 0.4 to 1.3 and an opacifying power of not less than 0.2, and a coating applied to either or both of the opposite surfaces of the polyester film.

The coating applied to the minute-cellular polyester film serves the purpose of improving the adhesive property of the polyester film.

3 Claims, No Drawings

MINUTE-CELLULAR POLYESTER FILM PROVIDED WITH COATING

CROSS-REFERENCE TO RELATED APPLICATION

The present application is a continuation-in-part of an international application designating the U.S. Pat. No. PCT/JP No. 88/00110 published as WO88/05797 on Aug. 11, 1988.

BACKGROUND OF THE INVENTION

This invention relates to a polyester film fabricated so as to contain numerous minute cells in the surface and inner parts thereof. More particularly, this invention relates to a stretched polyester film which has a lowered apparent specific gravity owing to formation therein of minute closed cells and is excellent in whiteness, opacifying properties, and adhesive properties.

Heretofore, polyester films have found extensive utility in various industrial fields owing to their excellence in mechanical properties, electrical properties, resistance to chemicals, and resistance to heat. Particularly the biaxially stretched polyethylene terephthalate film excels other films in planarity and dimensional stability and is marketed at a relatively low price and, therefore, it constitutes itself an indispensable materials for printing plates and for substrates in data devices.

The electronic white board is counted among the commodities which are used in offices and meeting rooms. A white biaxially stretched polyester film is used in the copy board part, i.e. an important part, of the electronic white board. White polyester films have been finding utility as substrates for magnetic cards represented by telephone cards and railway cashless cards which are widely spreaded in recent years. In these magnetic cards, the white polyester films are fully manifesting their outstanding properties mentioned above.

Indeed these white films possess highly desirable properties. They nevertheless suffer from various drawbacks because they require to contain a white pigment in a very large amount for the purpose of acquiring an enhanced opacifying properties. Since these films contain inorganic particles such as titanium oxide particles having a large specific gravity at times in a ratio exceeding 10% by weight, they have an apparent specific gravity exceeding 1.7, occasionally exceeding 2.0, and a weight per unit volume becomes 20 to 50% larger than that of their regular countertypes containing no pigment.

This increase in the apparent specific gravity causes accelerated sagging of film with aging under own weight. In the case of the white board mentioned above, for example, the phenomenon of sagging of the board surface with aging is greatly accelerated during long-term use, thereby seriously impairing the commercial value of the white board.

Moreover, the inorganic particles in the white film contribute to increase the rigidity of film and cause shortening the service life of a knife to be used in slitting a film or cutting a card. The film edges formed by slitting or cutting the film of increased rigidity are liable to inflict lacerations on operative's hands. Thus, the white films containing such inorganic particles have difficulties in terms of productivity and handling properties.

Further, as an inevitable consequence, such white films cause heavy labor during the work of packing or transportation.

The inventors of the present invention made a study in search of a way of decreasing the apparent specific gravity and consequently solving the various problems mentioned above. As the result of the study, it was found that the phenomenon of sagging of polyester film with aging under own weight could be notably eliminated by foaming the film and converting it into a minute-cellular film as proposed in Japanese Patent Application No. 61-313896 (1986). The finely dispersed closed cells in the film play a part in imparting opacifying properties to the film and consequently decreasing the amount of pigment to be added to the film and, at the same time, moderating the rigidity of film, lengthening the service life of the knife used for the slitting work, and appreciably eliminating the possibility of sharp film edges inflicting lacerations on operative's hands.

Though the minute-cellular polyester film has attained such outstanding effects as described above, it is not necessarily satisfactory in terms of the other film properties. It has been found that this film exhibits a poor adhesive property to a printing ink etc. as compared with the conventional white film contrary to the expectation that the film exhibits an improved adhesive property because of large surface irregularities thereof. It has been further pointed out that images printed thereon tend to blur. A need has developed, therefore, to provide the film of a quality capable of solving these difficulties.

The practice of subjecting polyester films to various surface treatments to provide the films of an improved adhesive property has been already known widely in the art. The flame treatment, solvent treatment, surface coating treatment, corona discharge treatment, plasma treatment, ultraviolet light treatment, ion plating treatment, radiation treatment, and sand blasting treatment are examples. With respect to these methods of treatment, proposals have been made for the improvement of the adhesive property.

These conventional surface treatments have been employed mainly for usual falt polyester films. They have never been applied to polyester films of the type having such an extremely high surface roughness as in the film according to the present invention.

This is because there has never arisen any need for improving the adhesive property in the case of films having relatively high surface roughness. Specifically, it has been widely understood that the adhesive force exhibited by the film of this nature increases with increasing the surface roughness because the contact are of this film with a given layer increases with increasing the surface roughness and further because an adhesive layer deeply entered into depressed portions of the surface of the film enhances anchoring effect. In fact, these films have yielded results which are accounted for substantially completely by this concept.

In the case of such a film as in the present invention, which has an extremely high surface roughness, the results to be obtained therewith deny the aforementioned conventional concept of adhesive property as described above. This fact clearly indicates that the various conventional method of surface treatment intended for improving the adhesive property of film are not always simply applicable. It is not necessarily easy to expect from the prior art a method for improving the adhesive property of a film having a special surface shape produced by inner cells as in the film of the present invention. Therefore, it may be said what method is effective in improving the adhesive property of the particular film under discussion is quite unknown.

In the circumstances, the desirability of developing a convenient and inexpensive method for improving the adhesive property of cellular films possessing special properties without impairing the inherent properties thereof has found approval.

The present inventors have continued a study with a view to the development of such a method as described above. They have consequently found that a uniaxially or biaxially stretched minute-cellular polyester film having a high level of surface roughness can shown an improved adhesive property by forming a coating on either or both of the surfaces of the film. The present invention has been accomplished on the basis of this finding.

SUMMARY OF THE INVENTION

In an aspect of the present invention, there is provided a film comprising a uniaxially or biaxially stretched minute-cellular polyester film having an apparent specific gravity in the range of 0.4 to 1.3 and an opacifying power of not less than 0.2, and a coating applied to either or both of the surfaces of said polyester film, said coating comprising at least one compound selected from the group consisting of thermoplastic polyesters soluble in organic solvents; water-dispersible thermoplastic polyesters containing sulfonates, etc.; alkyd type polyesters; polyurethane resins soluble is organic solvents or dispersible in water; polyisocyanate compounds; terminal-blocked polyurethane resins; vinyl type resins soluble in organic solvents or dispersible in water; epoxy type resins; silicon type resins; urea type resins; and malamine type resins and 0.01 to 10% by weight, based on the solid component of the coating, of at least one surfactant selected from the group consisting of anionic surfactants; cationic surfactants, amphoteric surfactants; and nonionic surfactants.

DETAILED DESCRIPTION OF THE INVENTION

The term "polyester" as used in the present invention refers to polyester which is produced by polycondensing an aromatic dicarboxylic acid such as terephthalic acid, isophthalic acid, or naphthalene dicarboxylic acid or an ester thereof with a glycol component such as ethylene glycol, diethylene glycol, 1,4-butanediol, neopentylene glycol, or 1,4-cyclohexanedimethanol.

Besides being produced by direct reaction of an aromatic dicarboxylic acid with a glycol component, the polyester can be produced by subjecting an alkyl ester of an aromatic dicarboxylic acid and a glycol component to transesterification and subsequently polycondensing the product of transesterification, or by polycondensing a diglycol ester of an aromatic dicarboxylic acid.

Polyethylene terephthalate, polyethylene-2,6-naphthalate, and polybutylene terephthalate can be cited as typical examples of the polyester. This polyester may be either a homopolyester or a copolyester resulting from copolymerization using a third comonomer. In any case, the polyester used in the present invention is preferred to contain not less than 70 mol %, preferably not less than 80 mol %, and more preferably not less than 90 mol %, of at least one constitutional repeating unit selected from the group consisting of ethylene terephthalate unit, ethylene-2,6-naphthalate unit, and butylene terephthalate unit.

When the polyester has an unduly low degree of polymerization, the produced film has insufficient mechanical strength. The polyester, therefore, is preferred to have an intrinsic viscosity of not less than 0.4, preferably 0.5 to 1.2, and more preferably 0.55 to 0.85.

When a film is formed of the conventional polyester, the polyester is fabricated so as to contain minute inactive particles as an agent for imparting surface roughness to the produced film so that the produced film will retain required slipping property between films or between the film and a metallic roll. The polyester to be used in the present invention is preferred not to contain such minute inactive particles. This because such minute inactive particles, when contained in the film, have the possibility of hindering a desired control of the whiteness and the opacifying properties of the film to be obtained. The polyester containing these minute inactive particles may be used, however, when the minute inactive particles have no adverse effect on the properties which the film to be produced is expected to show.

In the present invention, the film is produced using the polyester defined above. The film contains minute closed cells in the surface and inner parts thereof and has a surface roughness falling in the range of 1 to 300 $\mu$m, preferably 5 to 100 $\mu$m. The apparent specific gravity of the film is required to be in the range of 0.4 to 1.3, preferably 0.6 to 1.3, and more preferably 0.8 to 1.3. If the apparent specific gravity is more than 1.3, the prevention of the film from the phenomenon of sagging under own weight with aging is attained only with difficulty. Conversely, if it is less than 0.4, the produced film is deficient in mechanical strength.

The opacifying power of the film used in the present invention is required to be not less than 0.2, preferably to be not less than 0.3. If the specifying power is less than 0.2, the closed cells contained in the film are so large as to lower the mechanical strength and when such a film is used as a white film, incorporation of a large amount of pigment is necessitated.

For the film used in the present invention, one of the essential requirements is that it should be stretched at least uniaxially. The stretching is required to be made at a surface area ratio in the range of 4 to 30 times, preferably 9 to 20 times, the original size. The stretching is necessary because the polyester film in an unstretched state is deficient in mechanical strength as widely known.

The film used in the present invention is required to have the properties mentioned above. The method to be employed for the production of this film is not specifically defined. Any of the methods known in the art ma be employed on the condition that the produced film has the properties mentioned above and fulfils the requirements defined above. As methods available for the production of a film containing minute cells, the method of incorporation of a gas or a gasifiable substance as disclosed in Japanese Patent Application Laid-Open (KOKAI) No. 50-38765 (1975) and Japanese Patent Publication No. 57-46456 (1982), the method of incorporation of a substance capable of generating a gas by chemical decomposition as disclosed in Japanese Patent Application Laid-Open (KOKAI) No. 52-43871 (1977) and Japanese Patent Publication No. 58-50625 (1983), and the method which comprises mixing the material for film with a substance soluble in a solvent, forming the resultant mixture in the form of a film, impregnating the film in the solvent to extract the substance from the film as disclosed in Japanese Patent Application Laid- Open (KOKAI) No. 51-34963 (1976) and Japanese Patent Publication No. 52-27666 (1977) can be cited, for example. Any of these methods can be employed optionally. These methods, however, do not necessarily deserve to be called as readily practicable measures because they entail use of special forming devices or complicated production processes.

For the production of the minute-cellular polyester film used in the present invention, therefore, it is preferably to employ the method formerly proposed by the present inventors as disclosed in Japanese Patent Application No. 61-313896 (1986), for example. In this method, a film is produced by mixing a polyester with a specific polypropylene, extrusion molding the resultant mixture in the form of sheet, and subsequently stretching the sheet at least uniaxially. To be more specific, this method comprises mixing a polyester with 3 to 40 wt % of a crystalline polypropylene homopolymer having a melt flow index (hereinafter referred to as "M.F.I." for short) in the range of 0.2 to 120, melting and extrusion molding the resultant mixture thereby forming a substantially amorphous sheet, then stretching this sheet at least monoaxially at a surface area ratio of 4 to 30 times the original size thereby forming a film, thereby obtaining a polyester film containing numerous minute closed cells of a diameter in the range of 1 to 300 µm, preferably 5 to 100 µm, in the surface and inner parts thereof. The thickness of this film is in the range of 15 to 350 µm, preferably 25 to 250 µm.

By this method, the at least uniaxially stretched minute-cellular polyester film having an apparent specific density in the range of 0.4 to 1.3 and an opacifying power of at least 0.2 can be easily produced. Moreover, this minute-cellular polyester film can be produced with the conventional film forming device in its unmodified form under the conditions heretofore adopted for the production of the stretched polyester film of ordinary quality. Thus, the minute-cellular polyester film used in the present invention have a merit of low production cost.

The method thus used advantageously will be described more specifically below.

The crystalline polypropylene homopolymer to be used for incorporation in the polyester is a polymer comprising at least 95 mol %, preferably at least 98 mol % of propylene unit. If the polypropylene to be used is in an amorphous form, the amorphous sheet formed thereof suffers from bleeding out of polypropylene to the surface of the sheet and smear the surface of a cooling drum, a stretching roll, or the like. If the polypropylene contains not less than 10 mol % of ethylene unit incorporated by copolymerization, for example, the stretched film fails to contain minute closed cells of sufficient amount in the inner part thereof.

The M.F.I. of the polypropylene is preferred to fall in the range of 0.2 to 120, preferably in the range of 0.5 to 50. If the M.F.I. is less than 0.2, the cells to be formed are so large that the sheet will readily sustain fracture during the course of stretching. Conversely if the M.F.I. exceeds 120, the sheet, while being stretched with a tenter, slips off the clips. Thus, any deviation of the M.F.I. from the defined range brings about the disadvantage that the productivity of the method under discussion will be jeopardized.

The amount of the propylene to be incorporated is preferred to fall in the range of 3 to 40 wt %. If this amount is less than 3 wt %, the amount of minute cells to be produced is not sufficient and the film attains an apparent specific gravity of not more than 1.3 with difficulty. Conversely, if this amount exceeds 40 wt %, the molded sheet sustains fracture during the course of stretching.

For the method under discussion, it is another essential requirement that the molded sheet should be stretched at least uniaxially. This stretching is employed from not only the purpose of imparting sufficient mechanical strength to the produced film. The impartation of minute closed cells to the sheet is not attained solely by the blending of the polyester with the polypropylene. It is attained only when the blending is combined with the work of stretching.

The stretching method described above can be carried out under the same conditions as those used for the production of the conventional polyester film without requiring any special process. Specifically, the blend of the polyester and the polypropylene as a raw material is melted and extruded through a die in the form of a sheet by the use of a extruding machine at 250° C. to 300° C. and then cooled to a temperature below about 70° C. to give rise to a substantially amorphous sheet. Then, this sheet is stretched in the machine and/or transverse direction at a surface area ratio in the range of 4 to 30 times, preferably 9 to 20 times, the original size and further subjected to a heat treatment at 120° to 250° C. Thus, the minute-cellular film having an apparent specific gravity of 0.4 to 1.3 and an opacifying power of not less than 0.2 is easily produced.

The film of the present invention is put to use in the form of a white film having a high opacifying power. Optionally, one or more additive may be further incorporate therein on the condition that the additive incorporated should not impair the inherent properties of the film. Examples of the additive are antioxidant, ultraviolet absorbent, lubricant, antistatic agent, dye, pigment, fluorescent whitening agent, matting agent, and surfactant. Such additives as mentioned above may be incorporated in suitable amounts by a suitable method.

For the purpose of providing an increased adhesive strength to the produced film, this invention required to supply a coating to either or both of the surfaces of the minute-cellular polyester film.

In the various methods of surface treatment mentioned above, the method of flame treatment, for example, proves to be undesirable because it has poor reproducibility of the adhesive strength in the produced film. The method of solvent treatment is likewise undesirable because the treatment itself is liable to entail degradation of mechanical strength and the cells in the film are permeated by a solvent and the solvent so permeated in the cells is not easily removed.

In contrast, the method of corona treatment and the method of plasma treatment bring about some effect in the improvement of adhesive property. They nevertheless have the disadvantage that the adhesive strength imparted thereby gradually decreases with the passage of time and, as the result, the undesirable un-uniform adhesive occurs after the secondary fabrication of the film. Then, the method of sand blast treatment has the disadvantage that it brings about a large variation of the surface shape of the film and spoils the appearance of the produced film.

In the numerous methods of surface treatment mentioned above, therefore, the method of surface coating treatment, namely the method employed in the present invention proves to be most preferred. By forming this coating in an extremely small thickness, the possible impairment of the hand and appearance peculiar to the film can be precluded. Further, the improvement of the adhesive property can be easily adjusted according to any desired application. Thus, this method proves to be especially advantageous.

The compound for the coating to be applied to the minute-cellular polyester film may be either a high-molecular compound or a low-molecular compound. A coating agent can be selected according to intended use on the condition that the coating agent should impair the appearance and the surface roughness of the minute-cellular polyester film which is a base of the film according to the present invention.

For example, a composition of a thermoplastic resin and a cross-linking resin, and optionally further incorporating therein a lubricant and an antistatic agent may be suitably used. The coating agent may be a compound soluble in an organic solvent or a compound dispersible in water.

Examples of the coating agent include thermoplastic polyesters soluble in organic solvents, water-dispersible thermoplastic polyesters containing sulfonates, alkyd type polyesters, acryl modified polyesters, polyurethane resins soluble in organic solvents or dispersible in water, polyisocyanate compounds, thermal-blocked polyurethane resins, vinyl type resins soluble in organic solvents or dispersible in water represented by vinyl chloride-vinyl acetate type, vinylidene chloride type, styrene type, vinyl acetate type, and acrylic type resins, epoxy resins, silicon type resins, urea type resins, and melamine type resins.

The uses of the film of the present invention are not specifically defined. Since the required adhesive property depends on the intended use of the film, the composition for the coating is not specifically defined. As hitherto proposed, a polyurethane type coating shows a particularly desirable effect in improving the adhesive property to a magnetic layer using a urethane type binder and a vinyl type resin coating proves to be desirable where the produced film is printed with an ink for cellophane, for example.

These conventional proposals have been applied to flat polyester films of ordinary quality. None of these conventional coatings have ever been applied to a film which contains cells in the surface and inner parts thereof and has a very high surface roughness like the minute-cellular film used in the present invention. Thus, the coating employed in the present invention is not such that it could have been easily expected from the various proposals mentioned above.

The coating used in the present invention, when necessary according to the use of the film, may incorporate therein suitable amounts of various additives such as, for example, dye, pigment, lubricant, antioxidant, ultraviolet absorbent, antistatic agent, minute inorganic particles, and surfactant. Particularly, the incorporation of the surfactant proves to be advantageous for this invention because it improves the wettability of the minute-cellular polyester film to the coating and enhances the tightness of adhesion between them. In an experiment on the formation of various coatings, imperfect application of the coating solution was observed to probably because of heavy occurrence of large protuberances on the film surface. Thus, the incorporation of the surfactant in the coating solution was found to be preferable for the preclusion of this phenomenon.

The surfactant under discussion is readily concentrated at an interface between two substances and brings about remarkable change in the nature of the interface between the two substances The term as used in the present invention refers to a compound which has an ability to enhance the wettability of the surface of the minute-cellular polyester film with the coating solution. Examples of the compound include anionic surfactants, cationic surfactants, amphoteric surfactants, and nonionic surfactants.

As examples of the anionic surfactant, alkali metal salts of higher fatty acids popularly called "soap"; sulfuric ester salts such as alkali metal salts of higher alcohol-sulfuric esters and sulfonated oils; sulfonates such as alkali metal salts of alkylbenzenesulfonic acids; and phosphoric ester salts such as metal salts of phosphoric ester of higher alcohol-ethyleneoxide can be cited.

As examples of the cationic surfactant, amine salts such as stearyl amine and rosin amine; and quaternary ammonium salts such as lauryltrimethyl ammonium chloride and benzalkonium chloride can be cited.

As examples of the amphoteric surfactant, amino acid derivatives such a methyl laurylaminopropionate and sodium laurylaminopropionate; and betaines such as stearyl dimethyl betaine and lauryl dihydroxyethyl betaine can be cited.

As examples of the nonionic surfactant, polyalkylene glycols such as nonylphenylethylene oxide n-mol adducts and laurylalcoholethylene glycol n-mol adducts; and polyhydric alcohols such as lauric acid monoglyceride, pentaerythritol monopalmitate, and sorbitan-stearic triester can be cited.

Further, silicon type surfactants represented by polyalkylene oxide adducts of organopolysiloxane and polydimethylsiloxane can be cited. Fluorine type surfactants combined with anionic, cationic, and nonionic surfactants can be also cited.

The amount of such a surfactant as mentioned above to be added is preferred to fall in the range of 0.001 to 1 vol %, preferably 0.01 to 0.5 vol %, based on the amount of the coating solution. This is also preferred to fall in the range of 0.01 to 10 wt %, preferably in the range of 0.05 to 5 wt %, and more preferably in the range of 0.1 to 3 wt %, based on the solid component of the coating.

In the formation of the coating, the coating agent and the additives such as surfactant mentioned above are used in the form of a coating solution prepared by dispersing them in water or an organic solvent such as methyl ethyl ketone, methyl isobutyl ketone, tetrahydrofuran, toluene, methanol, cyclohexanone and dioxane.

The method to be employed for the formation of this coating is not specifically defined. It may be formed after the production of the minute-cellular polyester film or it may be formed at the same time that the polyester film is produced.

In the case of producing a biaxially stretched minute-cellular polyester film, for example, the method which comprises applying the coating solution on the film which has been uniaxially stretched in the machine direction, stretching the resultant coated film in a dried or undried state in the transverse direction, and immediately subjecting the biaxially stretched film to a heat treatment can be employed particularly advantageously because it simultaneously carries out the film-forming, coating, and drying works and, therefore, has a merit of low production cost.

As regards the device for the application of the coating solution, any of the conventional coaters, for example, roll coater such as reverse coater, gravure coater, kiss coater, and bar coater can be employed. Of course, these are not the only coaters that are available for the application.

Though the thickness of the coating can be varied according to the use of the film, it is preferred to fall in the range of 0.001 to 3 μm, preferably 0.01 to 1 μm, and more preferably 0.01 to 0.5 μm for the protection of the surface appearance peculiar to the minute-cellular polyester film which is used as the base for the film according to the present invention.

The coating must be formed on either or both of the surfaces of the minute-cellular polyester film. When it is to be formed on both surfaces of the film, the coating agent used on one surface may be the same or not the same as used on the other surface. These coating ,agents may be selected according to the use of the film.

Now, the present invention will be described more specifically below with reference to the following non-limitative examples. The various physical properties mentioned in the present invention were determined by the following methods.

(1) Apparent specific gravity:

A 10×10 cm square was cut as a sample from a desired part of a given film. The volume of this sample was calculated using the average thickness obtained by measuring thicknesses thereof at nine arbitrarily chosen points of the sample with a micrometer and averaging the values of measurement. The sample was weighed and the weight thereof per $cm^3$ was reported as an apparent specific gravity of the given film. This determination was conducted on five samples and the average of five values was employed as the result of the determination.

(2) Opacifying power

By the use of a densitometer, Macbeth TD-904 model, the density of transmitted light through a given film was measured under Filter G to find the opacifying power. The numerical value thus found increases with increasing opacifying power. This determination was performed at three points on the given film and the average of the three values was reported as the result of this determination.

(3) Surface roughness, Ra (μm)

By the use of a surface roughness tester produced by Kosaka Kenkyusho, Ltd. and marketed under product code of "SE-3F", the determination was carried out according to Japanese Industrial Standard (JIS) B-0601-1976, with necessary modifications. The conditions of determination were 2 μm of probe diameter, 30 mg of probe contact pressure 0.8 mm of cutoff, and 2.5 mm of length of measurement. The determination was performed at 12 points on the film and the remaining 10 values after omitting the largest and smallest values were averaged. The average was reported as the result of the determination.

(4) Evaluation of adhesive property to ink

On the surface of a given film, a given ink was solid-applied with a #8 bar coater and the applied layer of the ink was dried at 80° C. for two minutes to form an ink printing layer. The sample thus prepared was left standing overnight at 23° C. and 50% RH. Then, an adhesive tape (produced by Nichiban K.K. was applied to the surface of the ink printing layer and was peeled off instantaneously from one end. After this peeling, the adhesive strength of the ink printing layer to the film was visually rated on the following 5-point scale:

5: Complete absence of peeling of the ink printing layer from the film.
4: Peeling of a very small part of the ink printing layer from the film.
3: Peeling of a part of the ink printing layer from the film.
2: Peeling of practically all the ink printing layer from the film.
1: Peeling of the entire ink printing layer from the film.

(5) Evaluation of coating property

A given coating was formed on the surface of a given film. The applied layer of the coating was visually observed. The conditions of uniformity of coating and cissing of coating were rated each on the following three-point scale.

(Uniformity of coating)

O: Uniform coating such that the coating shows the same gloss as the surface of the base film.
Δ: The coating shows a slightly different gloss from the surface of the base film.
X: The coating shows an uneven gloss clearly different from the surface of the base film.

(Cissing of coating)

O: Uniform coating such that practically no cissing is observed.
Δ: The coating shows a slight cissing during the course of application.
X: The coating shows many cissings during the course of application.

(6) Melt flow index, M.F.I. (g/10 min.)

The determination was carried out according to the procedure defined in JIS K-6758-1981, with necessary modifications. The value found by this determination decreases with increasing melt viscosity.

EXAMPLE 1

A raw material prepared by blending polyethylene terephthalate chips having an intrinsic viscosity number of 0.652 with 10 wt % of a crystalline polypropylene homopolymer having an M.F.I of 5 (g/10 min.) was melted at 290° C. and extruded with an extruder in the form of a sheet onto a cooling drum at 40° C. to obtain an amorphous sheet about 650 μm in thickness. Then, this sheet was uniaxially stretched in the machine direction at a ratio of 3 times the original length. With a roll coater, a water dispersion prepared by mixing 20 wt % of a water-dispersible polyester resin (terephthalic acid-/isophthalic acid/sodium isophthalic sulfonate/ethylene glycol/diethylene glycol/triethylene glycol type condensed polymer), 79.5 wt % of a water-dispersible polyester polyurethane resin (terephthalic acid/isophthalic acid/dimethylpropionic acid/ethylene glycol/-diethylene glycol/ispholone diisocyanate type polymer), and 0.5 wt % of an anionic surfactant (sodium dodecylbenzenesulfonate) was applied to the uniaxially stretched film. The coated film was immediately stretched in the transverse direction at a ratio of 3.3 times the original length and then subjected to a heat treatment at 240° C. for five seconds to obtain a biaxially stretched film 100 μm in thickness having a coating 0.1 μm in thickness.

The produced film was found to have an apparent specific gravity of 1.0, an opacifying power of 0.61, and an Ra of 0.5 (μm) on the coating surface. These properties were substantially equal to those of the film obtained in Comparative Example 2 (to be cited later on). The produced film was a white film having practically the same hand of surface as that of the film of Comparative Example 2.

The ink adhesive property of the film was 5 for the polyester grade ink, 5 for the cellocolor ink, 4 for the UV screen ink, and 5 for the UV offset ink, indicating a remarkably improved adhesive property over the film of Comparative Example 2 and a favorably comparative adhesive property with the film of Comparative Example 1 (to be cited later on).

By visual observation, the coating was found to have uniformity of coating rated by the rank ○ and cissing of coating rated by the rank ○, indicating that the coating have a highly satisfactory coating property.

EXAMPLE 2

A biaxially stretched film 100 μm in thickness having a coating 0.1 μm was obtained by following the procedure of Example 1, excepting 1 wt % of a nonionic surfactant (lauryl alcohol-ethylene glycol n-mol adduct) was used as a surfactant instead and 79 wt % of the polyester polyurethane resin was incorporated in the water dispersion used for the formation of the coating.

The produced film was found to have an apparent specific gravity of 1.0, an opacifying power of 0.61, and an Ra of 0.51 (μm). Thus, it was a white film exhibiting equal film properties and practically equal surface hand to those of the film of the Comparative Example 2.

The ink adhesive property of this film was 5 both for the polyester grade ink and the cellocolor ink and 4 both for the UV screen ink and the UV offset ink, indicating as high improvement in adhesive strength as that of the film of Example 1.

The coating was found to have uniformity of coating rated by the rank ○ and cissing of coating rated by the rank Δ, indicating that the coating have a desirable coating property.

EXAMPLE 3

A film 100 μm in thickness having a coating 0.2 μm in thickness was obtained by following the procedure of Example 1, except for using no surfactant and changing the amount of the polyester-polyurethane resin to 80 wt % in the water dispersion used for the formation of the coating.

The produced film was found to have an apparent specific gravity of 1.0, an opacifying power of 0.61, and an Ra of 0.52 (μm). The film properties and hand of the film surface was practically the same as those of the film of Comparative Example 2 having no coating The ink adhesive property of the film was 5 both for the polyester grade ink and the cellocolor ink and 4 both for the UV screen ink and the UV offset ink, indicating that the film had a desirable adhesive strength.

The coating was found to have uniformity of coating rated by the rank Δ and cissing of coating rated by the rank X, indicating that the coating showed a suitable properties to actual use, whereas, slightly inferior in coating properties.

EXAMPLE 4

A film 100 μm in thickness having a coating 0.1 μm in thickness was obtained by following the procedure of Example 1, except for using the water dispersion for the formation of the coating comprising 30 wt % of polyester-terpolyurethane resin and 70 wt % of styrene-butadiene rubber resin instead.

The produced film was found to have an apparent specific gravity of 1.0, an opacifying power of 0.61, and an Ra of 0.5 (μm), showing the same film properties as those of the film of Comparative Example 2, similarly to the films of Examples 1 to 3.

The ink adhesive property of this film was 5 for the polyester grade ink, 4 for the cellocolor ink, 3 for the UV screen ink, and 5 for the UV offset ink, indicating that the film had a satisfactory adhesive strength. The coating was found to have a desirable coating property.

EXAMPLE 5

A film 100 μm in thickness having a coating 0.1 μm in thickness was obtained by following the procedure of Example 1, except for using a raw material which was prepared by adding 3 wt % of a master-batch chips of polyethylene terephthalate, prepared by mixing 5 wt % of crystalline polypropylene homopolymer having an M.F.I. of 10 (g/10 min) and 1 wt % of a fluorescent whitening agent with polyethylene terephthalate, into polyethylene terephthalate chips having an intrinsic viscosity number of 0.652, and the water dispersion for the formation of the coating comprising 30 wt % of polyester-polyurethane resin and 70 wt % of vinylidene chloride resin instead.

The produced film was found to have an apparent specific gravity of 1.2, an opacifying power of 0.46, and an Ra of 0.28 (μm), showing practically the same film properties as those of the film of Comparative Example 3 (to be cited later on). The hand of the film surface was similarly the same as that of the film of Comparative Example 3.

The ink adhesive property of this film was found to be 5 both for the polyester grade ink and the cellocolor ink, 4 for the UV screen ink, and 3 for the UV offset ink. As regards the coating property, the coating was found to have uniformity of coating rated by the rank ○ and cissing of coating rated by the rank ○. It was a white film having a highly desirable coating.

EXAMPLE 6

The same raw material used in Example 5 was melted at 290° C. and extruded with an extruding machine in the form of a sheet onto a cooling drum at 40° C., to obtain an amorphous sheet about 1 mm in thickness. Then, this sheet was stretched in the longitudinal direction at a ratio of 3 times the original length and in the transverse direction at a ratio of 3.3 times the original length and subjected to a heat treatment at 240° C. for five seconds, to obtain a biaxially stretched minute-cellular film 100 μm in thickness.

With a bar coater, the same water dispersion of the water-dispersible polyester was applied. The applied layer of the water dispersion was dried at 80° C. for two minutes, to produce a film having a coating 0.1 μm in thickness.

The produced film was found to have an apparent specific gravity of 1.2, an opacifying power of 0.46, and an Ra of 0.25 (μm). It was a white film having practically the same film properties and surface had as the film before forming the coating thereon.

The ink adhesive property of this film was found to be 5 both for the polyester grade ink and the cellocolor ink, 3 for the UV screen ink, and 4 for the UV offset ink, indicating that the film had a highly desirable adhesive strength. Though the coating showed a slight sign of cissing of coating, the film had a highly desirable coating property.

EXAMPLE 7

The same procedure as in Example 1 was repeated to obtain a uniaxially stretched film.

This uniaxially stretched film was applied with a water dispersion prepared in the same manner as in Example 1 except for using a water-dispersible acryl modified polyester resin(terephthalic acid/isophthalic acid/sodium sulfonylphthalate/ethylene glycol/diethylene glycol/acrylamide type resin) in stead of the water-dispersible polyester polyurethane resin to obtain a biaxially stretched film having a coating. Film properties and the results of the tests are shown in Table 1.

COMPARATIVE EXAMPLE 1

By the use of a biaxial extruding machine provided with a vent, polyethylene terephthalate chips having an intrinsic viscosity number of 0.652 was blended with 40 wt % of titanium oxide pigment having an average particle diameter of 0.3 μm to obtain a master-batch chips. A raw material prepared by mixing polyethylene terephthalate and 25 wt % of the master-batch chips was melted at 290° C. and extruded with an extruding machine in the form of sheet onto a cooling drum at 40° C., to obtain an amorphous sheet about 1 mm in thickness. Then, this sheet was stretched in the machine direction at a ratio of 3 times the original length and in the transverse direction at a ratio of 3.3 times the original length and subjected to a heat treatment at 240° C. for five seconds, to produce a biaxially stretched film having a thickness of 100 μm, an apparent specific gravity of 1.45, an opacifying power of 0.69, and an Ra of 0.05 (μm).

This film is generally called as a white film. It was a very flat film having a high specific gravity despite an appreciabel opacifying power.

The ink adhesive property of this film was found to be 5 for the polyester grade ink, 3 for the cellocolor ink, for the UV screen ink, and 1 for the UV offset ink.

COMPARATIVE EXAMPLE 2

A biaxially stretched film 100 μm in thickness was obtained by following the procedure of Comparative Example 1, excepting 10 wt % of crystalline polypropylene homopolymer chips having an M.F.I. of 5 (g/10 min.) were incorporated in the place of the titanium oxide pigment master-batch chips. The produced film was found to have an apparent specific gravity of 1.0, an opacifying power of 0.61, and an Ra of 0.5 m), and reduced in the specific gravity as compared with the film of Comparative Example 1. It was a white film having a high surface roughness and a unique hand.

The ink adhesive property of the film was found to be 2 for the polyester grade ink and 1 for each of the cellocolor ink, the UV screen ink, and the UV offset ink. It was inferior in terms of adhesive strength to the white film of ordinary quality produced in Comparative Example 1.

COMPARATIVE EXAMPLE 3

A biaxially stretched film 100 μm in thickness was obtained by following the procedure of Comparative Example 2, excepting 3 wt % of polyethylene terephthalate master-batch chips prepared by blending polyethylene terephthalate, 5 wt % of crystalline polypropylene homopolymer chips having an M.F.I. of 10 (g/10 min.) and 1 wt % of a fluorescent whitening agent was incorporated in the plate of the polypropylene.

The film thus produced was found to have an apparent specific gravity of 1.2, an opacifying power of 0.46, and an Ra of 0.27 (μm). This film was white film having a reduced specific gravity as compared with the film of Comparative Example 1.

The ink adhesive property of this film was found to be 3 for the polyester grade ink, 2 for the cellocolor ink, and 1 for both the UV screen ink and the UV offset ink, indicating that the film had an adhesive strength inferior to that of the film of Comparative Example 1.

TABLE 1

| Example or Comparative Example | Base polymer composition | | | | Film properties | | Composition of coating | | | | | Thickness of coating (μm) | Adhesive property for ink | | | | Coating properties | |
|---|---|---|---|---|---|---|---|---|---|---|---|---|---|---|---|---|---|---|
| | Polypropylene | | Additive | | Apparent specific gravity | Opacifying power | main components | | | surfactant C | Mixing ratio (A:B:C) | | Polyester grade ink | Cellocolor ink | UV screen ink | UV offset ink | Uniformity of coating | Cissing of coating |
| | M.F.I. (g/10 min.) | Amount used (wt %) | Kind | Amount used (wt %) | | | A | B | | | | | | | | | | |
| Example 1 | 5 | 10 | — | — | 1.0 | 0.61 | PES (A)*1 | PU*2 | | Anionic*3 | 20:79.5:0.5 | 0.1 | 5 | 5 | 4 | 5 | ○ | ○ |
| Example 2 | 5 | 10 | — | — | 1.0 | 0.61 | PES (A) | PU | | Nonionic*4 | 20:79:1 | 0.1 | 5 | 5 | 4 | 4 | ○ | △ |
| Example 3 | 5 | 10 | — | — | 1.0 | 0.61 | PES (A) | PU | | — | 20:80:0 | 0.2 | 5 | 5 | 4 | 4 | △ | × |
| Example 4 | 5 | 10 | — | — | 1.0 | 0.61 | PES (A) | SBR*5 | | — | 30:70:0 | 0.1 | 5 | 4 | 3 | 5 | △ | ○ |
| Example 5 | 10 | 5 | Fluorescent whitening agent | 0.03 | 1.2 | 0.46 | PES (A) | PVDC*6 | | — | 30:70:0 | 0.1 | 5 | 5 | 4 | 3 | ○ | ○ |
| Example 6 | 10 | 5 | same the above | 0.03 | 1.2 | 0.46 | PES (A) | — | | — | 100:0:0 | 0.1 | 5 | 5 | 3 | 4 | ○ | △ |
| Example 7 | 5 | 10 | — | — | 1.0 | 0.61 | PES (A) | PES (B)*7 | | Anionic | 20:79.5:0.5 | 0.1 | 5 | 5 | 5 | 5 | ○ | ○ |
| Comparative Experiment 1 | — | — | 0.3 μm TiO2 | 10 | 1.45 | 0.69 | — | — | | — | — | — | 5 | 3 | 1 | 1 | — | — |
| Comparative Experiment 2 | 5 | 10 | — | — | 1.0 | 0.61 | — | — | | — | — | — | 2 | 1 | 1 | 1 | — | — |
| Comparative Experiment 3 | 10 | 5 | Fluorescent whitening agent | 0.03 | 1.2 | 0.46 | — | — | | — | — | — | 3 | 2 | 1 | 1 | — | — |

*1PES (A): Water-dispersible polyester resin (terephthalic acid/isophthalic acid/sodium isophthalic sulfonate/ethylene glycol/diethylene glycol/triethylene glycol type condensed polymer)
*2PU: Water-dispersible polyester polyurethane resin (terephthalic acid/isophthalic acid/dimethylpropionic acid/ethylene glycol/diethylene glycol/isophorone diisocyanate type polymer)
*3Anionic type: Anionic type surfactant (sodium dodecylbenzene sulfonate)
*4Nonionic type: Nonionic type surfactant (lauryl alcohol ethylene glycol n-mol adduct)
*5SBR: Styrene-butadiene rubber resin
*6PVDC: Vinylidene chloride resin
*7PES (B): Water-dispersible acryl modified polyester resin (terephthalic acid/isophthalic acid/sodium sulfonyphthalate/ethylene glycol/diethylene glycol/acrylamide type polymer)

What is claimed is:

1. A film comprising a uniaxially or biaxially stretched minute-cellular polyester film having an apparent specific gravity in the range of 0.4 to 1.3 and an opacifying power of not less than 0.2, and a coating applied to either or both of the surfaces of said polyester film, said coating comprising at least one compound selected from the group consisting of thermoplastic polyesters soluble in organic solvents; water-dispersible thermoplastic polyesters containing sulfonates; alkyd type polyesters; acryl modified polyesters; polyurethane resins soluble in organic solvents or dispersible in water; polyisocyanate compounds; terminal-blocked polyurethane resins; vinyl type resins soluble in organic solvents or dispersible in water; epoxy type resins; silicon type resins; urea type resins; and melamine type resins.

2. The film according to claim 1, wherein said minute-cellular polyester film comprises a polyester comprising not less than 70 mol % of at least one constitutional repeating unit selected from the group consisting of ethylene terephthalate unit, ethylene-2,6-naphthalate unit and butylene terephthalate unit and having an intrinsic viscosity of not less than 4, and 3 to 40 wt % of a crystalline polypropylene homopolymer comprising at least 95 mol % of propylene unit and having a melt flow index of 0.2 to 120.

3. The film according to claim 1 or 2, wherein said coating contains 0.01 to 10% by weight, based on the solid component of said coating, of at least one surfactant selected from the group consisting of anionic surfactants; cationic surfactants, amphoteric surfactants; and nonionic surfactants.

* * * * *

UNITED STATES PATENT AND TRADEMARK OFFICE
CERTIFICATE OF CORRECTION

PATENT NO. : 4,857,396
DATED : August 15, 1989
INVENTOR(S) : S. Otonari; Y. Sato; N. Masuda; and T. Kotani It is certified that error appears in the above—identified patent and that said Letters Patent is hereby corrected as shown below:

On the cover sheet of the Patent, at item [73], change "Daifoil Company, Ltd." to --Diafoil Company, Limited--.

Signed and Sealed this

Nineteenth Day of March, 1991

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,857,396

DATED : August 15, 1989

INVENTOR(S) : Otonari et al

It is certified that error appears in the above-identified patent and that said Letters Patent is hereby corrected as shown below:

Column 1, lines 8-10, should read as follows:

--Serial No. 07/245,318, filed 09/15/88, now U.S. Patent No. 4,871,784, which is derived from international application No. PCT/JP No. 88/00110 published as WO 88/05797 on August 11, 1988.--.

Signed and Sealed this

Seventeenth Day of November, 1992

Attest:

DOUGLAS B. COMER

*Attesting Officer*   Acting Commissioner of Patents and Trademarks